(12) United States Patent
Neumann

(10) Patent No.: US 8,146,535 B1
(45) Date of Patent: Apr. 3, 2012

(54) THERMALLY CONTROLLED DRINKING WATER SYSTEM FOR ANIMALS

(76) Inventor: Edward C. Neumann, Spring, TX (US)

( * ) Notice: Subject to any disclaimer, the term of this patent is extended or adjusted under 35 U.S.C. 154(b) by 511 days.

(21) Appl. No.: 12/319,477

(22) Filed: Jan. 7, 2009

Related U.S. Application Data

(60) Provisional application No. 61/010,370, filed on Jan. 7, 2008.

(51) Int. Cl.
*A01K 7/00* (2006.01)
(52) U.S. Cl. ............................. 119/73; 119/72
(58) Field of Classification Search .................. 119/51.5, 119/72, 73
See application file for complete search history.

(56) References Cited

U.S. PATENT DOCUMENTS

| | | | |
|---|---|---|---|
| 3,555,848 A | 1/1971 | Johnson | |
| 3,941,553 A * | 3/1976 | Bedford | 431/80 |
| 4,584,966 A * | 4/1986 | Moore | 119/73 |
| 5,140,134 A | 8/1992 | Reusche et al. | |
| 5,345,063 A | 9/1994 | Reusche et al. | |
| 5,423,194 A | 6/1995 | Senecal | |
| 5,661,979 A | 9/1997 | DeBoer | |
| 5,718,124 A | 2/1998 | Senecal | |
| 5,782,094 A | 7/1998 | Freeman | |
| 5,845,600 A * | 12/1998 | Mendes | 119/51.5 |
| 6,167,945 B1 | 1/2001 | Bottum, Sr. et al. | |
| 6,205,950 B1 * | 3/2001 | Thompson, Jr. | 119/51.5 |
| 6,363,886 B1 * | 4/2002 | Statton | 119/51.5 |
| 6,647,741 B2 | 11/2003 | Pechous et al. | |
| 6,976,371 B2 | 12/2005 | Gleason et al. | |
| 7,762,211 B1 * | 7/2010 | McDaniel | 119/51.5 |
| 2009/0217881 A1 * | 9/2009 | Chambers | 119/73 |
| 2010/0206237 A1 * | 8/2010 | Reusche et al. | 119/73 |

* cited by examiner

*Primary Examiner* — Kimberly Smith
(74) *Attorney, Agent, or Firm* — Kenneth A. Roddy

(57) ABSTRACT

A thermally controlled drinking water system for animals having a thermally insulated cabinet containing a water reservoir, a water bowl, a vapor-compression refrigeration water-cooling system, and an electric water heating system, maintains the drinking water at an optimal temperature in both hot weather and freezing weather conditions. The reservoir stores at least five days of water and automatically maintains the water bowl in a constantly filled condition through a water supply conduit and visual indicator indicates when the reservoir water level is getting low. The evaporator coil of the cooling system is engaged with the water bowl in heat exchange relation and electrical heating elements are engaged in heat exchange relation with the water bowl and reservoir. Cooling and heating operations are controlled by an ambient air temperature sensor on the cabinet exterior and a water temperature sensor on the side wall of the water bowl.

14 Claims, 3 Drawing Sheets

THERMALLY CONTROLLED DRINKING WATER SYSTEM FOR ANIMALS

CROSS REFERENCE TO RELATED APPLICATION

This application claims priority of U.S. Provisional Patent Application Ser. No. 61/010,370, filed Jan. 7, 2008.

BACKGROUND OF THE INVENTION

1. Field of the Invention

This invention relates generally to refrigerated and heated pet and animal bowls and dishes, and more particularly to a thermally controlled drinking water system for animals having a cabinet which contains a water reservoir, a water bowl and a refrigeration/heating system that maintains the water at an optimal temperature in both hot weather and freezing weather conditions.

2. Background Art

There are water bowls and water dispensers for pets and other animals known in the art, which are equipped with various heating devices to prevent liquids such as water from freezing when it is placed outdoors in freezing weather.

Reusche et al, U.S. Pat. Nos. 5,140,134 and 5,345,063 disclose a nestable heated bowl, such as a pet bowl, designed to prevent liquids such as water from freezing when it is placed outside in cold, below freezing weather. The heated bowl comprises an outer wall, an inner wall and a bottom wall integrally connected to one another, the inner wall defining a cavity for receiving water or food. The inner wall and outer wall taper upwardly to define a space and are joined together to define a bowl edge. The inner wall, outer wall, and bowl edge of a second bowl are adapted to be received in said space in a compact, stackable fashion. An electric heating element, thermostat and cord are carried on underside of the bottom wall.

Bottum, Sr. et al, U.S. Pat. No. 6,167,945 discloses a non-freezing watering dish for animals that is heated by geothermal heat transferred through a sealed tube having a heating end and an opposite condensation end configured to be inserted into the ground with the heated end below freezing line. A phase change material having a gas phase and a liquid phase is sealed in the tube. Heat is absorbed from the ground into the liquid phase to generate a heated gas phase that rises to the condensation end. A condenser conducts the heat to a removable dish and condenses the gas to a cooled liquid phase that is returned to the heated end.

There are also water bowls and containers for pets and other animals known in the art that are designed to keep the contents cool for a period of time in warm and hot weather. Such bowls or containers typically have a water or food container in heat exchanging contact with a freezable material.

Pechous et al, U.S. Pat. No. 6,647,741 discloses a cooling system for cooling the contents of a utensil such as dog dishes, bait containers and food containers, that utilizes a removable, reusable, refillable, freezable toroidal-shaped cooling insert reservoir for containing a freezable coolant such as water or a gel and a toroidal-shaped insulator. The cooling insert and insulator stack in a nested manner within the utensil to provide improved insulating and longer cooling of the utensil contents. A secured bottom holder removably holds the cooling insert and insulator within the utensil. The cooling system includes the use of a temperature sensor and display which provides a visual indicator when the contents have reached a temperature indicating the contents are no longer being properly cooled.

There are also food warming and refrigerated chilling bowls and containers known in the art that are designed for use indoors to be placed on a table or countertop to keep food products warm or cold during a meal or social gathering. Such bowls or containers typically have a small electric heater in heat exchange contact with a food receptacle or a refrigeration unit that conducts cold air over the contents of the food receptacle. These types of bowls and containers tend to be relatively expensive, and would be inefficient outdoors and unsuitable for outdoor use.

Senecal, U.S. Pat. Nos. 5,423,194 and 5,718,124 disclose a counter-top service bowl for chilling various foods and beverages. A miniaturized refrigeration system is secured to the outer surface of the bowl having an evaporator coil disposed within a coil chamber. Air is directed by a fan through the chamber and into the middle of the bowl cavity and inducted back into the circulation chamber through holes at the bottom of the bowl. In operation the bowl acts as a chiller wherein solid foods such as fruit is chilled by air circulation and associated contact along the surface of the bowl.

Johnson, U.S. Pat. No. 3,555,848 discloses a self-contained portable cooler for food receptacles in which the cooler houses a complete small mechanical refrigeration unit, the evaporator of which is arranged to support a food receptacle which is placed on a cooled plate contacting the evaporator unit.

DeBoer, U.S. Pat. No. 5,661,979 discloses a self-contained storage and display unit intended to be used for fruit. Cooling of the device is accomplished by the use of commercially available thermoelectric cooling (TEC) chips and a fan. A heat sink is included to dissipate the heat generated by the TEC chips. The rate of fresh air flow through the storage area can be controlled by the user to speed or slow the ripening rate of the fruit.

Freeman, U.S. Pat. No. 5,782,094 discloses a refrigerated countertop snack container in the form of a lidded cookie jar which utilizes a Peltier effect thermoelectric element as the cooling module located beneath the main interior compartment formed by a hygienic thermally-conductive liner that is thermally insulated from the container's outer shell and is held at 38° F. for optimal food refrigeration. Heat generated by the refrigeration process is dissipated from a finned aluminum heat sink that is cooled by forced air from a fan.

Gleason et al, U.S. Pat. No. 6,976,371 discloses a portable refrigerated food cooling container that includes a base defining an open interior cavity. An electric refrigeration unit is disposed in the base for cooling the contents of the interior cavity. A food container is removably disposed within the interior cavity of the base such that the cooled air is prevented from entering the food container and instead is trapped and circulated within the interior cavity surrounding the food container. A lid is positionable over the food container and configured to be removably placed onto an upper edge of the base or onto the food container to form a generally airtight seal therebetween.

Thus, there exists a need for a thermally controlled water bowl for animals that is particularly suited for use outdoors in all seasons to maintain the animal's water at an optimal temperature for an extended period of time in warm and hot weather and also during both cold and freezing weather.

The present invention is distinguished over the prior art in general, and these patents in particular by a thermally controlled drinking water system for animals having a thermally insulated cabinet containing a water reservoir, a water bowl, a vapor-compression refrigeration water-cooling system, and an electric water heating system maintains the drinking water at an optimal temperature in both hot weather and freezing weather conditions. The reservoir stores at least five days of water and automatically maintains the water bowl in a constantly filled condition through a water supply conduit and visual indicator indicates when the reservoir water level is getting low. The evaporator coil of the cooling system is engaged with the water bowl in heat exchange relation and the electrical heating elements encircle the upper portion of the water bowl and engage the bottom of the reservoir. Cooling and heating operations are controlled by an ambient air temperature sensor on the cabinet exterior and a water temperature sensor on the side wall of the water bowl. The apparatus may also include a tip-over switch, ground fault safety breaker, chew proof cord, and a grounding rod.

SUMMARY OF THE INVENTION

It is therefore an object of the present invention to provide a thermally controlled drinking water system for animals that is suited for use indoors and outdoors in all seasons to maintain the animal's water at an optimal temperature for an extended period of time in warm and hot weather and also during both cold and freezing weather.

It is another object of this invention to provide a thermally controlled drinking water system for animals that will maintain the animal's drinking water at a temperature in a range of from about 45° F. to about 60° F. year round in an outdoor setting.

Another object of this invention is to provide a thermally controlled drinking water system for animals that has a reservoir that will store at least five days of water for use by the animal and a drinking water bowl supplied with water from the reservoir.

Another object of this invention is to provide a thermally controlled drinking water system for animals that has a fail-safe electrical system including a tip-over switch, ground fault safety breaker, chew proof cord, and a grounding rod.

Another object of this invention is to provide a thermally controlled drinking water system for animals that has a water level monitoring system and visual display that will indicate when the water level is getting low.

Another object of this invention is to provide a thermally controlled drinking water system for animals that has a reservoir with a filling port and a water supply conduit that will automatically supply water to the water bowl and shut off the water supplied to maintain the water bowl in a constantly filled condition.

A further object of this invention is to provide a thermally controlled drinking water system for animals that is constructed of materials suitable for use outdoors and resistant to prolonged exposure to weather elements, corrosion, and animal urine.

A still further object of this invention is to provide a thermally controlled drinking water system for animals that is simple in construction, inexpensive to manufacture, and rugged, safe and reliable in operation.

Other objects of the invention will become apparent from time to time throughout the specification and claims as hereinafter related.

The above noted objects and other objects of the invention are accomplished by a thermally controlled drinking water system for animals having a thermally insulated cabinet containing a water reservoir, a water bowl, a vapor-compression refrigeration water-cooling system, and an electric water heating system, that maintains the drinking water at an optimal temperature in both hot weather and freezing weather conditions. The reservoir stores at least five days of water and automatically maintains the water bowl in a constantly filled condition through a water supply conduit and visual indicator indicates when the reservoir water level is getting low. The evaporator coil of the cooling system is engaged with the water bowl in heat exchange relation and the electrical heating elements encircle the upper portion of the water bowl and engage the bottom of the reservoir. Cooling and heating operations are controlled by an ambient air temperature sensor on the cabinet exterior and a water temperature sensor on the side wall of the water bowl. The apparatus may also include a tip-over switch, ground fault safety breaker, chew proof cord, and a grounding rod.

DESCRIPTION OF THE PREFERRED EMBODIMENT

Figure 1:
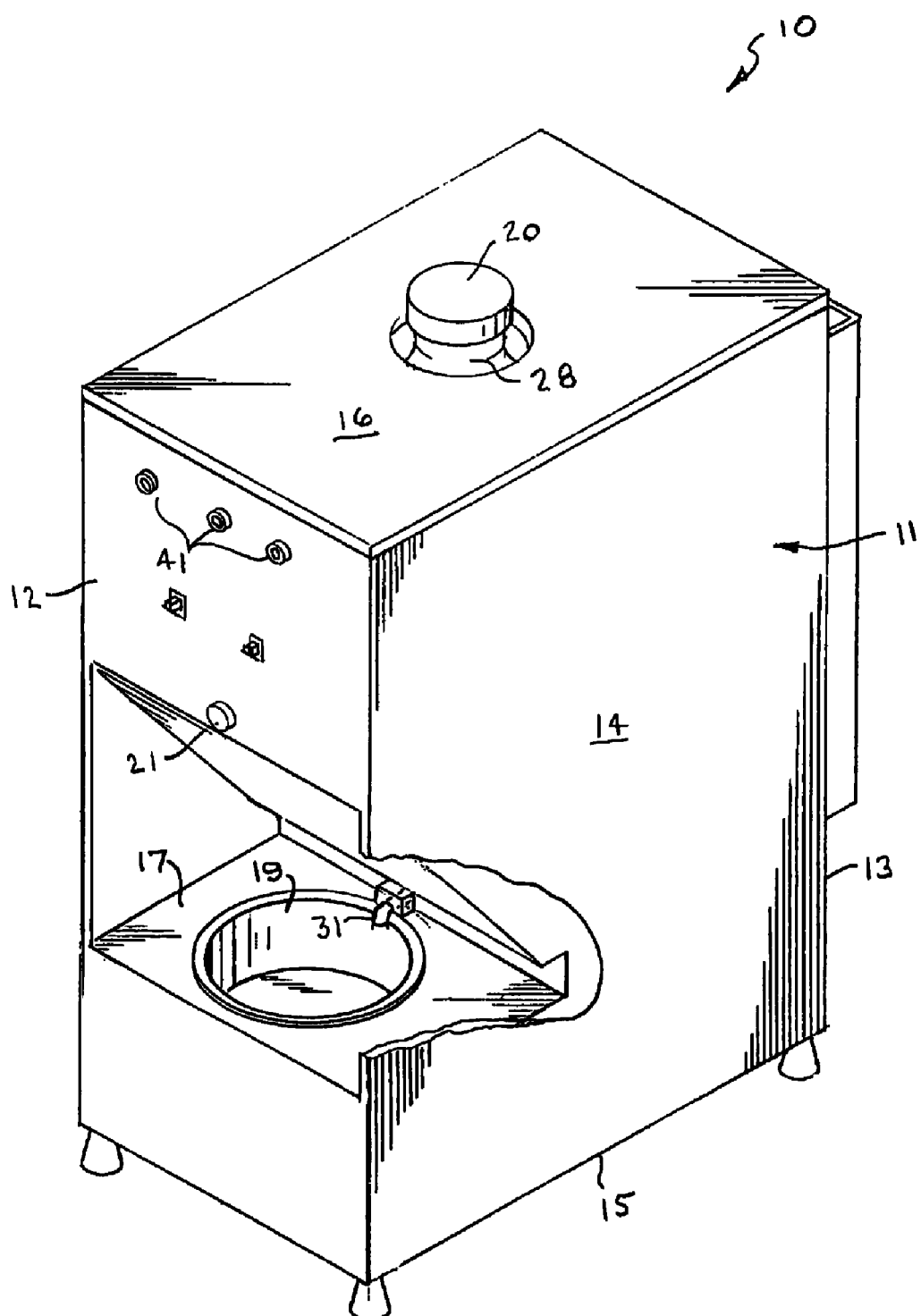
FIG. 1 is a perspective view of the thermally controlled drinking water apparatus in accordance with the present invention.
Figure 2:
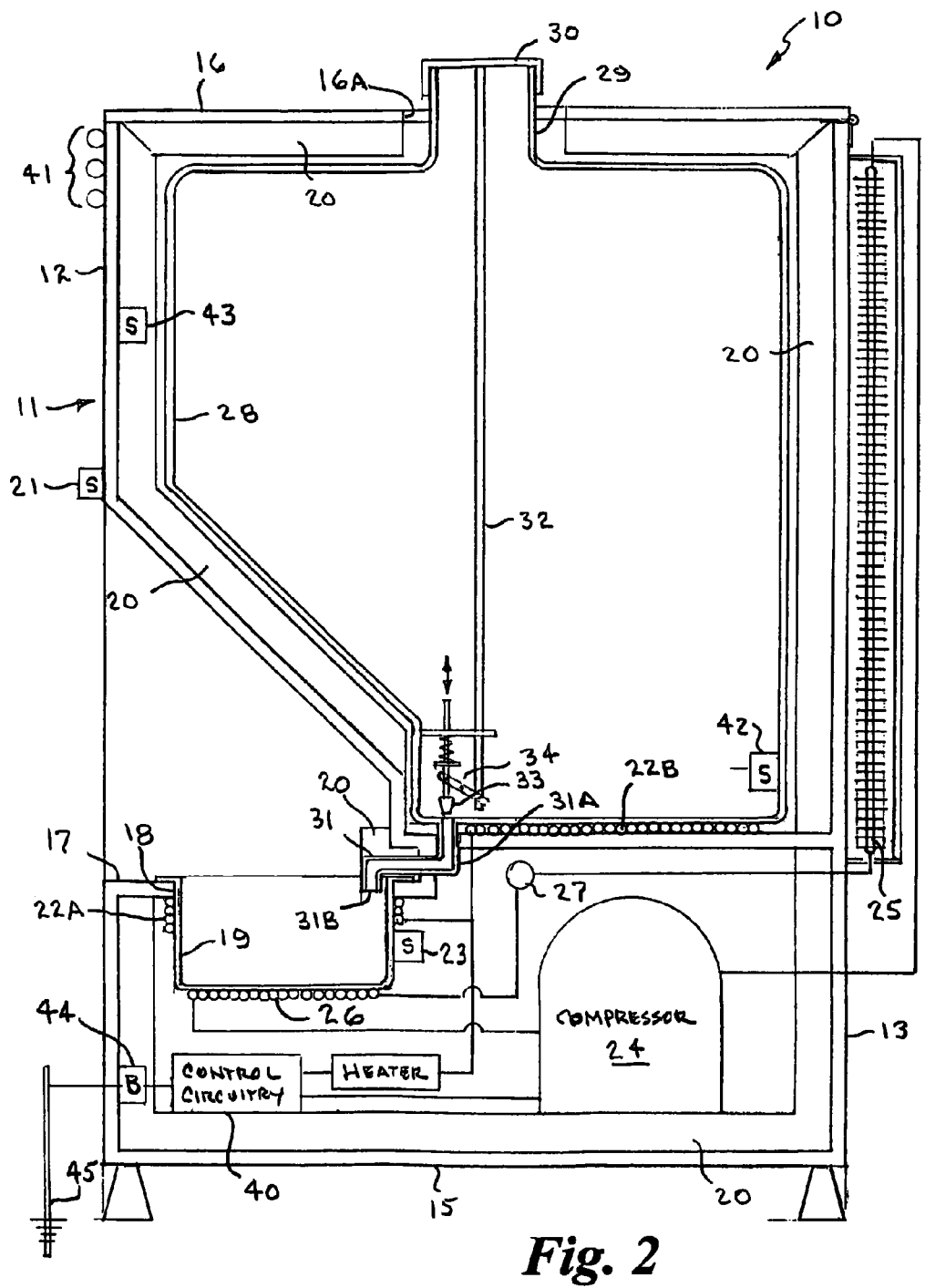
FIG. 2 is a longitudinal cross section of the thermally controlled drinking water apparatus, taken along line 2-2 of FIG. 1.
Figure 3:
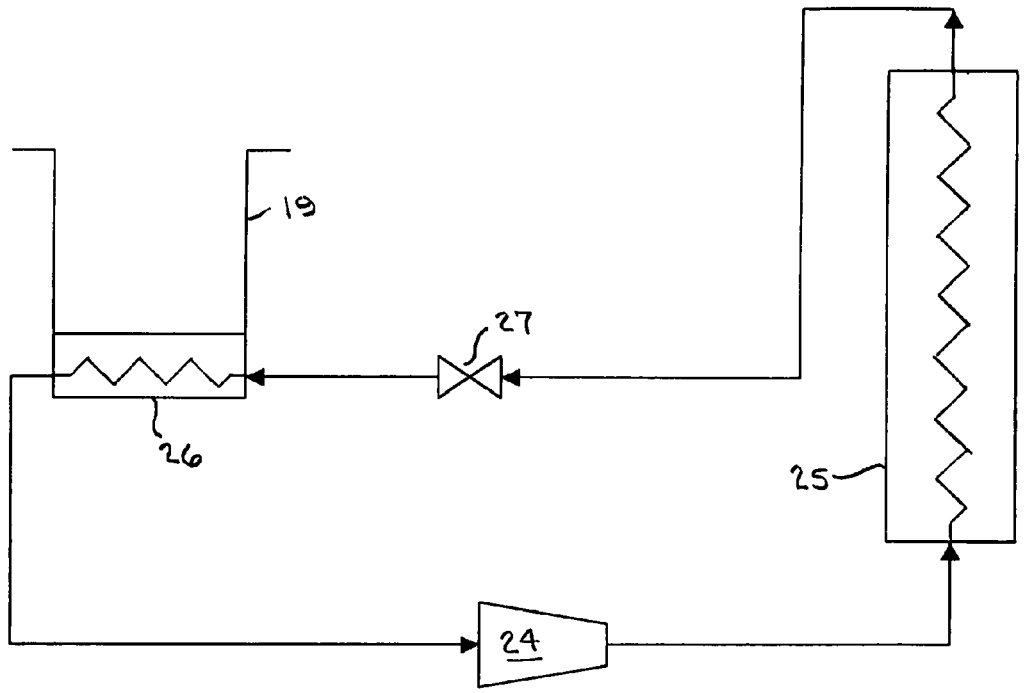
FIG. 3 is a schematic block diagram of the refrigeration cooling system of the thermally controlled drinking water system.
Figure 4:
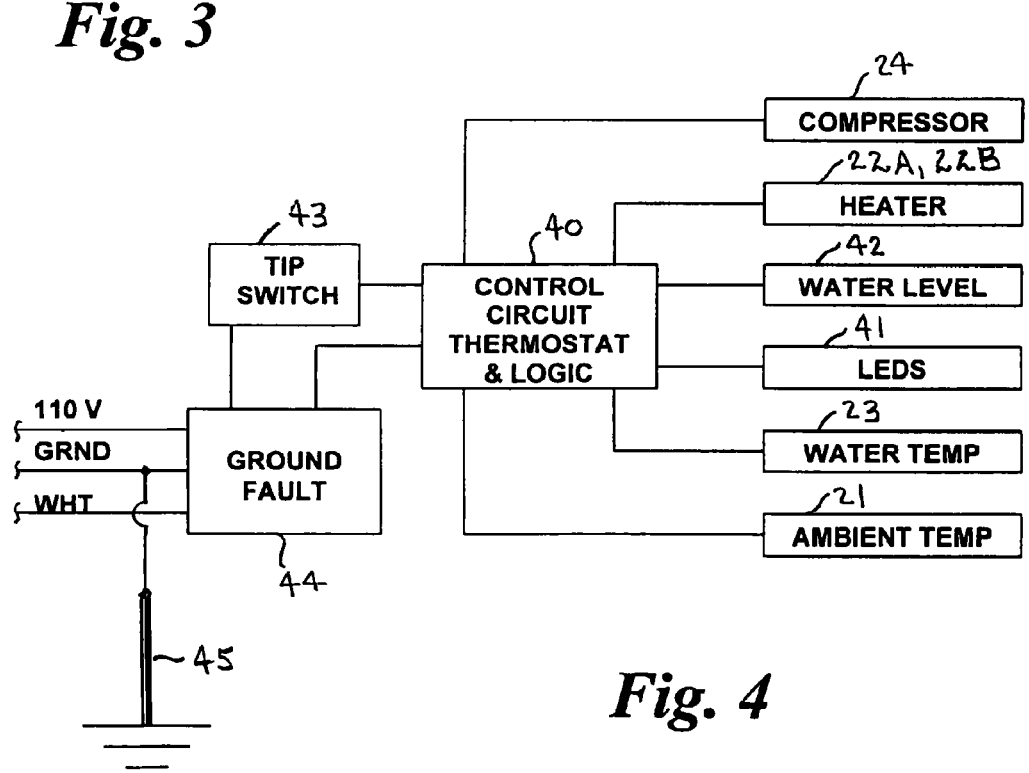
FIG. 4 is a schematic block diagram of the electrical control system for the cooling and heating sensors and indicator of the thermally controlled drinking water system.

Referring to the drawings by numerals of reference, there is shown in FIGS. 1-4, a preferred thermally controlled drinking water system 10 for animals. The drinking water system 10 includes a thermally insulated cabinet 11 containing a water reservoir tank, a drinking water bowl, a cooling system and a heating system, with associated conduits and associated electrical circuitry, as described in detail hereinafter. The drinking water system 10 maintains the animal's drinking water in a range of from about 45° F. to about 60° F. year round in an outdoor setting.

The cabinet 11 is a generally rectangular box-like structure formed of wood or plastic having a front wall 12, a rear wall 13, laterally opposed side walls 14, a bottom wall 15, and a hinged lid 16. The lower portion of the front wall 12 extends inwardly and downwardly and adjoins the rear edge of a horizontal platform 17 that extends forwardly from the lower wall portion and transversely between the side walls 14. A circular hole 18 is formed in the horizontal platform 17 and a cup-shaped drinking water bowl 19 is mounted in the hole. The interior of the cabinet 11 is lined with a layer of thermally insulating material 20, such as expanded polystyrene (Styrofoam®) or equivalent material. In a preferred embodiment, the layer of thermally insulating material 20 is approximately 1" thick. A temperature sensor or thermostat 21 is mounted on exterior of the cabinet for sensing ambient exterior temperature conditions.

The water bowl 19 is formed of a non-corrosive metal alloy material that has good heat conduction (such as copper) and a smooth surface finish on the interior to allow cleaning and discourage biological growth. In a preferred embodiment, the water bowl 19 is approximately 6" in diameter and 3" in height.

The water heating system includes a first coiled electrical heating element 22A, which encircles the upper portion of the side wall of the water bowl 19, and a second coiled electrical heating element 22B disposed beneath the bottom of the water reservoir tank 28 in heat exchanging relation. A water temperature sensor or thermostat 23 is also mounted on the side wall of the water bowl 19.

The water cooling system is a vapor-compression refrigeration system that includes a compressor 24 disposed inside the cabinet 11, a condenser coil 25 disposed on the exterior of the cabinet adjacent to the rear wall 13 having an inlet connected with the discharge side of the compressor, an evaporator coil 26 having an inlet connected with the outlet of the condenser coil, and an expansion device 27 disposed in the line between the condenser coil and evaporator coil. The evaporator coil 26 is formed into a small coil and is engaged on the exterior of the bottom wall of the water bowl 19 in heat exchange relation.

The water reservoir tank 28 is a vessel capable of holding from about 3-5 gallons water that will allow nominal 5 days of normal water consumption between fillings. The reservoir tank 28 has an externally threaded filling neck 29 at its top end that extends through a hole 16A in the lid 16 of the cabinet 11 and receives a removable screw-on fill cap 30.

A water supply conduit 31 having a first end 31A connected in fluid communication with the interior of the reservoir tank 28 extends outwardly and downwardly therefrom terminating in a second end 31B disposed in the water bowl 19 a short distance below its open top end so as to conduct water from the reservoir into the water bowl.

A flow control rod 32 is slidably supported vertically in the reservoir tank 28 and has a spring biased shut-off valve element 33 connected by a pivot link 34 at its lower end movably disposed above the first end 31B of the water supply conduit 31, and its top end is engageable with the fill cap 30. When the fill cap 30 is removed, the control rod rises and the spring biased shut-off valve element 33 is lowered under spring pressure to a closed position to close the water supply conduit 31 and prevent water flow from the reservoir tank 28 to the water bowl 19 during the reservoir filling operation. When the fill cap 30 is screwed back on, the control rod 32 will be depressed to raise the spring biased shut-off valve element 33 to an open position allowing water to flow from the reservoir tank to the water bowl through the water supply conduit 31.

When the water level in the water bowl 19 drops below the second end 31B of the water supply conduit 31, air enters reservoir tank 28 through the water supply conduit and water will flow into the water bowl 19, and as the water level reaches the second end of the water supply conduit, it will prevent air from entering the reservoir so as to maintain the water supply in the bowl at a constant level.

The following is an example of the heat load calculations for the cooling cycle and heating cycles utilizing a water bowl that is 6" in diameter and 3" deep, and surrounded by a 1" thick insulating sleeve of Styrofoam® or equivalent thermally insulating material.

Cooling Cycle

In the cooling cycle design conditions, the unit is disposed outdoors in an ambient temperature of 95° F. and the goal is to maintain a water temperature of 80° F. in the reservoir tank (entering water), and a water temperature of 50° F. in the water bowl. The bottom of the bowl will have a layer of ice on the interior with a surface temperature of 30° F., and the bottom surface will be insulated with a U factor of 0.26. The side wall of the bowl will have a surface temperature of 35° F., and will be insulated with a U factor of 0.26. The water surface temperature at the top of the bowl will be at 50° F. and exposed to the ambient temperature of 95° F.

Sensible Loads Cooling Cycle:

Where: Q (TTL heat load)=Area in sq ft×U factor×Temperature differential in degrees: Q=Area sq ft×U×T (F)

1. Top Area:
Area=3.14×9"=28.27 in$^2$
28.27 in$^2$/144 in$^2$/sq ft=0.196 sq ft
Q=0.196 sq ft×1×45° F.=8.82 BTU/HR 2. Side Wall Area:
Area=25.13 in circumference×3" in depth=75.40 in$^2$
75.40 in$^2$/144 in$^2$/sq ft=0.524 sq ft
Q=0.524 sq ft×0.26×60° F.=8.17 BTU/HR 3. Bottom Area:
Area=3.14×16"=50.27 in$^2$
50.27 in$^2$/144 in$^2$/sq ft=0.35 sq ft
Q=0.35 sq ft×0.26×65° F.=5.92 BTU/HR Total Sensible Load=8.82 BTU/HR+8.17 BTU/HR+5.92 BTU/HR=22.91 BTU/HR 4. Radiant Heat Gain:
Solar radiant heat load, summer,=424 BTU/HR/sq ft
Shading factor=0.40
424 BTU/HR/sq ft×0.40 shading factor×0.196 sq ft=33.24 BTU/HR 5. Pull Down or Product Load from 80° F. to 50° F.:
6" diameter×3" deep bowl=84.81 in$^3$ volume
84.81 in$^3$/231 in$^3$/gallon=0.36 gallon volume
0.36 gallon×0.1337 cu ft/gallon=0.048 cu ft
Water=62.4 lbs/cu ft
0.048 cu ft×62.4 lbs/cu ft=3 lbs of water in bowl
Entering water temperature=80° F., desired water temperature=50° F.
Temperature Differential ( )=30° F.
Specific heat of water=1 (1° F./hr/1 BTU)
3 lbs×30° F.=90 BTU/HR
We have designed a desirable pull down time to be 0.5 hours; therefore the cooling capacity must be 180 BTU/HR.

6. Total Load Cooling Cycle:
Sensible load @ 22.91 BTU/HR+Pull Down load @ 180 BTU/HR+33.24 Radiant Load=236 BTU/HR Heating Cycle In the heating cycle design conditions, the unit is disposed outdoors in an ambient temperature of −20° F. and the goal is to maintain a water temperature of 50° F. in the reservoir tank (entering water), and a water temperature of 50° F. in the water bowl. The side wall of the bowl will have a surface temperature of 50° F., and will be insulated with a U factor of 0.26. The water surface temperature at the top of the bowl will be at 50° F. and exposed to the −20° F. ambient temperature. There will be no pull down load.

Sensible Loads Heating Cycle:

1. Top Area:
Area=3.14×9"=28.27 in$^2$
28.27 in$^2$/144 in$^2$/sq ft=0.196 sq ft
Q=0.196 sq ft×1×70° F.=13.72 BTU/HR 2. Side Wall Area:
Area=25.13 in circumference X 3" in depth=75.40 in$^2$
75.40 in$^2$/144 in$^2$/sq ft=0.524 sq ft
Q=0.524 sq ft×0.26×70° F.=9.54 BTU/HR 3. Bottom Area:
Area=3.14×16"=50.27 in$^2$
50.27 in$^2$/144 in$^2$/sq ft=0.35 sq ft
Q=0.35 sq ft×0.26×70° F.=6.37 BTU/HR 4. Reservoir Tank Area:
Q=20 sq ft×0.26×70° F.=364 BTU/HR Total Heating load=13.72 BTU/HR+9.54 BTU/HR+6.37 BTU/HR+6.37 BTU/HR=394 BTU/HR
394 BTU/HR/3.412 BTU/HR/Watt=115 Watts From the calculations in the examples above, when initially filling the water bowl with water at a temperature of 80°

F., the refrigeration system would be required to overcome a heat load of 236 BTU/HR to maintain a water temperature of 50° F. in the water bowl when the unit is disposed in an ambient temperature of 95°. When the unit is disposed in an ambient temperature of −20°, the heating system would be required to overcome a heat load of 394 BTU/HR (115 Watts) to maintain a water temperature of 50° F. This is beyond the capacity of most conventional Peltier effect cooling systems that could be operated at a reasonable cost. Therefore, the present invention advantageously utilizes a vapor-compression cooling/heating unit rather than a Peltier effect cooling system.

In operation, after initial pull down, the refrigerant enters the compressor 24 in the saturated vapor state and is compressed to a higher pressure, resulting in a higher temperature. The hot, compressed vapor is passed to the condenser coil 25 and is cooled and condensed into a liquid and the refrigerant rejects heat which is carried away by the chimney effect. The condensed liquid refrigerant is next routed through the expansion device 27 where it undergoes an abrupt reduction in pressure which lowers the temperature of the liquid and vapor refrigerant mixture. The cold mixture is then routed through the evaporator coil 26 where the circulating refrigerant absorbs and removes heat from the water in the water bowl 19 and the heat is subsequently rejected in the condenser coil 25 and transferred to the ambient air exterior of the cabinet, and the refrigerant vapor from the evaporator coil is again a saturated vapor and is routed back into the compressor to complete the refrigeration cycle.

Operation

The vapor-compression cooling/heating unit becomes operational based on the ambient temperature (outdoors), and switches between heating and cooling modes depending upon the temperature. For example: when the outside temperature is greater than 40° F., the unit's cooling mode is enabled. This allows the water in the bowl to be maintained at about 50° F. despite solar load on clear days.

When the outside temperature is less than 40° F., the first sensor or thermostat 21 located on the cabinet exterior completes a circuit to supply electrical power to the heating coils 22A, 22B to heat the water in the water bowl 19 and reservoir tank 28 to 50° F. and the second sensor or thermostat 23 located on the water bowl 19 senses when the water temperature reaches that temperature and shuts off power to the heating coils.

In a preferred embodiment, the system is operated on ordinary 110 V AC supplied through a conventional armored power cord or cable to prevent the animal from chewing the cord. As shown schematically in FIG. 4, the compressor 24, the heater 22, the ambient temperature sensor or thermostat 23, and the water temperature sensor or thermostat 23 are electrically connected in a control circuit in a circuit board 40 mounted in the cabinet. Light emitting diodes 41 connected with the control circuit may be provided on the cabinet exterior to indicate when the heating and the cooling system are operating. A water level switch 42 may also be mounted in the reservoir tank 28 and connected with the control circuit 40 through light emitting diodes 41 to indicate that the water supply reservoir is approaching an empty condition.

A tip-over switch 43 and a ground fault safety breaker 44 may also be mounted in the cabinet 11, and a grounding rod 45 may also be provided exterior of the cabinet, all of which are connected in the control circuit 40. The tip-over switch 43 will become activated to turn off power to the unit in the event that the cabinet is accidentally tipped over. The ground fault safety breaker 44 and grounding rod 45 are to prevent electrical shock.

The electrical wiring and circuitry is conventional and well known to those skilled in the art and, therefore, are not shown and described in detail.

Alternatively, the present drinking water system 10 may be provided without the water reservoir tank 28, the second coiled electrical heating element 22B beneath the bottom of the water reservoir tank, the water supply conduit 31, and the associated flow control rod 32, pivot link 34, and shut-off valve 33 that controls the water supply to the water bowl 19.

In this modification, the water bowl 19 may be filled manually or by other means. As described previously, and shown in FIGS. 1, 2, 3 and 4, The water bowl 19 is supported in the thermally insulated cabinet 11, and the water heating system includes the first coiled electrical heating element 22A, which encircles the upper portion of the side wall of the water bowl 19, and a water temperature sensor or thermostat 23 is mounted on the side wall of the water bowl 19. Also as described previously, the vapor-compression refrigeration water cooling system includes the compressor 24 disposed inside the cabinet 11, the condenser coil 25 disposed on the exterior of the cabinet adjacent to the rear wall 13 having an inlet connected with the discharge side of the compressor, the evaporator coil 26 engaged on the exterior of the bottom wall of the water bowl 19, and the expansion device 27 disposed between the condenser coil and evaporator coil.

The modified drinking water system 10 may be operates the same as described above wherein the vapor-compression cooling/heating unit becomes operational based on the ambient temperature (outdoors), and switches between heating and cooling modes depending upon the temperature. Also, as described previously, and shown in FIG. 2, the modified drinking water system may include the tip-over switch 43 and ground fault safety breaker 44 mounted in the cabinet 11, and a grounding rod 45 may also be provided exterior of the cabinet, all of which are connected in the control circuit 40, and the 110 V AC power may be supplied through a conventional armored power cord or cable to prevent the animal from chewing the cord.

It should be understood that the present invention is not limited to any one species of animal. The preferred thermally controlled drinking water system 10 is not only suitable for dogs and cats, but may also be adapted for use by birds, bovine, swine, horses, and any other type of animal that will need or benefit from thermally controlled drinking water.

For example, a major problem for wild birds in winter is finding a source of water that is not frozen. In northern climates, wild birds perish each year due to a lack of drinking water close enough to food sources. The present thermally controlled drinking water system 10 would provide wild birds a reliable source of unfrozen water during the winter months. In the summer months, water in available bird baths and dispensers is subject to solar heating. It is not uncommon for the water in these devices to reach temperatures exceeding 100° F. This makes the water unsuitable for birds during the heat of the day when they need water the most. The present thermally controlled drinking water system 10 maintains the water at 50° F. during the summer and provides a water source the birds can use during the hottest parts of the summer days when their need for water is the greatest.

In another example, horses and cows are usually watered from open water troughs and buckets, which are subject to freezing in the winter making water unavailable to the animals; and in the summer, they are subject to solar heating, thus, making the water unpalatable to the animals. The present thermally controlled drinking water system 10 eliminates the freezing of the water in winter and makes the water much more palatable in summer. This leads to better animal health and performance.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein.

Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention. Thus, it shall be understood that while this invention has been described with respect to various specific examples and embodiments, the invention is not limited thereto and that it can be variously practiced within the scope of the following claims.

The invention claimed is:

1. A thermally controlled drinking water system for animals, comprising:
   a thermally insulated housing containing a water reservoir and a drinking water bowl;
   a vapor-compression refrigeration system including a compressor disposed in said housing, a condenser coil connected with said compressor disposed on the exterior of said housing, a refrigerant evaporator coil connected with said condenser coil and said compressor, and an expansion device disposed between said condenser coil and said evaporator coil, said evaporator coil engaged in heat exchange relation with said drinking water bowl for cooling water contained therein;
   an electric water heating system disposed in said housing including an electrical heating element engaged in heat exchange relation with said drinking water bowl for heating water contained therein;
   an ambient air temperature sensor on the exterior of said housing for sensing ambient exterior temperature conditions operatively connected with said vapor-compression refrigeration system operational during periods of hot weather to activate said refrigeration system upon sensing ambient temperature above a preset high temperature to cool water in said drinking water bowl, and a water temperature sensor operatively connected with said drinking water bowl and said vapor-compression refrigeration system to deactivate said refrigeration system upon the water in said bowl reaching a preset desired temperature so as to maintain water in said drinking water bowl below a preset high temperature; and
   said water temperature sensor operatively connected with said drinking water bowl and said electric water heating system operational during periods of cold weather to activate said electric heating element upon sensing a water temperature below a preset low temperature to heat water in said drinking water bowl, and to deactivate said heating element upon the water in said drinking water bowl reaching a preset desired temperature so as to maintain water in said drinking water bowl and said water reservoir above a preset low temperature;
   said vapor-compression refrigeration system, said electric water heating system, said ambient air temperature sensor and said water temperature sensor connected through control circuitry with an electrical power supply.

2. The thermally controlled drinking water system according to claim 1, wherein
   said electric water heating system has a first electrical heating element engaged in heat exchange relation with said drinking water bowl for heating water contained therein, and a second electrical heating element engaged in heat exchange relation with said water reservoir for heating water contained therein.

3. The thermally controlled drinking water system according to claim 2, wherein
   said water temperature sensor is operatively connected with said drinking water bowl and said water reservoir to activate said first and second electric heating elements upon sensing a water temperature below a preset low temperature to heat water in said drinking water bowl and said water reservoir, and to deactivate said first and second heating elements upon the water in said drinking water bowl reaching a preset desired temperature.

4. The thermally controlled drinking water system according to claim 1, wherein
   said water reservoir has a volume sufficient to contain from about 3 to about 5 gallons of water, and is connected with said drinking water bowl through a water supply conduit so as to automatically maintain said drinking water bowl in a filled condition;
   said water supply conduit having a first end in fluid communication with the interior of said reservoir tank and a second end disposed in said drinking water bowl such that upon the water level in said drinking water bowl dropping below said second end, air enters said reservoir through said water supply conduit allowing water to flow into said drinking water bowl, and upon the water level reaching said second end, air is preventing from entering said reservoir so as to maintain the water supply in the bowl at a constant level.

5. The thermally controlled drinking water system according to claim 4, further comprising:
   a water level switch mounted in said reservoir at a lower end thereof operatively connected with light emitting diodes on the exterior of said housing through said control circuitry to visually indicate a low water level condition in said reservoir.

6. The thermally controlled drinking water system according to claim 1, further comprising:
   a tip-over switch operatively connected with said control circuitry to shut off power supplied to the drinking water system upon sufficient angular displacement.

7. The thermally controlled drinking water system according to claim 1, further comprising:
   a ground fault safety breaker connected with said control circuitry.

8. The thermally controlled drinking water system according to claim 1, further comprising:
   a grounding rod connected with said control circuitry.

9. The thermally controlled drinking water system according to claim 1, wherein
   said electrical power supply is connected with said control circuitry by an armored power cable.

10. A thermally controlled drinking water system for animals, comprising:
    a thermally insulated housing containing a drinking water bowl;
    a vapor-compression refrigeration system including a compressor disposed in said housing, a condenser coil connected with said compressor disposed on the exterior of said housing, a refrigerant evaporator coil connected with said condenser coil and said compressor, and an expansion device disposed between said condenser coil and said evaporator coil, said evaporator coil engaged in heat exchange relation with said drinking water bowl for cooling water contained therein;

an electric water heating system disposed in said housing including an electrical heating element engaged in heat exchange relation with said drinking water bowl for heating water contained therein;

an ambient air temperature sensor on the exterior of said housing for sensing ambient exterior temperature conditions operatively connected with said vapor-compression refrigeration system operational during periods of hot weather to activate said refrigeration system upon sensing ambient temperature above a preset high temperature to cool water in said drinking water bowl, and a water temperature sensor operatively connected with said drinking water bowl and said vapor-compression refrigeration system to deactivate said refrigeration system upon the water in said bowl reaching a preset desired temperature so as to maintain water in said drinking water bowl below a preset high temperature; and said water temperature sensor operatively connected with said drinking water bowl and said electric water heating system operational during periods of cold weather to activate said electric heating element upon sensing a water temperature below a preset low temperature to heat water in said drinking water bowl, and to deactivate said heating element upon the water in said drinking water bowl reaching a preset desired temperature so as to maintain water in said drinking water bowl and said water reservoir above a preset low temperature;

said vapor-compression refrigeration system, said electric water heating system, said ambient air temperature sensor and said water temperature sensor connected through control circuitry with an electrical power supply.

11. The thermally controlled drinking water system according to claim 10, further comprising:

a tip-over switch operatively connected with said control circuitry to shut off power supplied to the drinking water system upon sufficient angular displacement.

12. The thermally controlled drinking water system according to claim 10, further comprising:

a ground fault safety breaker connected with said control circuitry.

13. The thermally controlled drinking water system according to claim 10, further comprising:

a grounding rod connected with said control circuitry.

14. The thermally controlled drinking water system according to claim 10, wherein said electrical power supply is connected with said control circuitry by an armored power cable.

\* \* \* \* \*